(12) United States Patent
Kampitsch et al.

(10) Patent No.: US 12,240,146 B2
(45) Date of Patent: Mar. 4, 2025

(54) NOZZLE FOR DISPENSING CONCRETE, MORTAR OR THE LIKE

(71) Applicant: MAI INTERNATIONAL GMBH, Feistritz/Drau (AT)

(72) Inventors: Klaus Kampitsch, Kamering (AT); David Kampitsch, Paternion (AT)

(73) Assignee: MAI INTERNATIONAL GMBH, Feistritz/Drau (AT)

( * ) Notice: Subject to any disclaimer, the term of this patent is extended or adjusted under 35 U.S.C. 154(b) by 265 days.

(21) Appl. No.: 18/011,603

(22) PCT Filed: Jun. 1, 2021

(86) PCT No.: PCT/EP2021/064593
§ 371 (c)(1),
(2) Date: Dec. 20, 2022

(87) PCT Pub. No.: WO2021/259595
PCT Pub. Date: Dec. 30, 2021

(65) Prior Publication Data
US 2023/0302680 A1     Sep. 28, 2023

(30) Foreign Application Priority Data
Jun. 23, 2020   (DE) .......................... 102020003760.7

(51) Int. Cl.
  *B28C 5/08* (2006.01)
  *B28C 5/16* (2006.01)
(52) U.S. Cl.
  CPC .......... *B28C 5/0862* (2013.01); *B28C 5/0818* (2013.01); *B28C 5/16* (2013.01)
(58) Field of Classification Search
  CPC ........ B28C 5/0862; B28C 5/0818; B28C 5/16
  (Continued)

(56) References Cited

U.S. PATENT DOCUMENTS 5,876,116 A * 3/1999 Barker ................ B01F 33/5011
                                                366/195
6,481,883 B1 * 11/2002 Ellen ...................... B28C 5/166
                                                366/65
(Continued)

FOREIGN PATENT DOCUMENTS

AU   2021298045 A1 *  1/2023  .............. B01F 27/90
DE       1246680 B      8/1967
(Continued)

OTHER PUBLICATIONS

PCT International Search Report and Written Opinion completed by the ISA/EP on Nov. 29, 2021 and issued in connection with PCT/EP2021/064593.
(Continued)

*Primary Examiner* — Paul R Durand
*Assistant Examiner* — Michael J. Melaragno
(74) *Attorney, Agent, or Firm* — Barnes & Thornburg LLP (57) ABSTRACT

The invention relates to a nozzle (10) for dispensing concrete, mortar or the like, comprising a housing (12) and a mixing chamber (14) which is arranged therein and is delimited by a circumferential wall (16) and extends along a longitudinal axis (L) at least between a supply opening (19) and an outlet opening (20); an actively driveable mixing device, which is arranged in the mixing chamber (14); and an exit opening (32), which is directly or indirectly flow-connected to the outlet opening (20) of the mixing chamber (14). At least one cavity (44; 44a, 44b), which extends axially and in the circumferential direction, is arranged around the circumferential wall (16) of the mixing chamber (14) and is in contact with the circumferential wall (16) and at least substantially surrounds the mixing chamber (14) in the circumferential direction. The circumferential wall (16) of the mixing chamber (14) consists of elastic material, (Continued)

which is adapted to deform dynamically into the at least one cavity (44; 44a, 44b) during operation of the nozzle. In this way, the formation of deposits on the circumferential wall (16) of the mixing chamber (14) is avoided.

17 Claims, 5 Drawing Sheets

(58) Field of Classification Search
USPC .................................... 222/148, 240, 241
See application file for complete search history.

(56) References Cited

U.S. PATENT DOCUMENTS

| | | | |
|---|---|---|---|
| 12,064,901 B2 * | 8/2024 | Kuhn | B01F 27/0725 |
| 2002/0100519 A1 * | 8/2002 | McGregor | B65B 1/46 |
| | | | 141/264 |
| 2019/0047176 A1 * | 2/2019 | Kuhn | B28C 5/143 |
| 2023/0302680 A1 * | 9/2023 | Kampitsch | B01F 35/511 |
| 2024/0181676 A1 * | 6/2024 | Kuhn | B28C 5/143 |

FOREIGN PATENT DOCUMENTS

| | | | | |
|---|---|---|---|---|
| DE | 10311342 B3 * | 8/2004 | ........ | B01F 15/00837 |
| DE | 102020003760 A1 * | 12/2021 | .............. | B01F 27/90 |
| EP | 3431172 A1 | 1/2019 | | |
| GB | 2134220 A | 8/1984 | | |
| JP | S60153928 A | 8/1985 | | |
| WO | 9400229 A1 | 1/1994 | | |
| WO | WO-2015176092 A2 * | 11/2015 | .......... | B01F 13/1027 |

OTHER PUBLICATIONS

German language Corrected PCT International Preliminary Report on Patentability mailed Nov. 28, 2022 and issued in connection with PCT/EP2021/064593.

German Office Action mailed Apr. 22, 2021 and issued in connection with German Patent Appln. No. 102020003760.7.

* cited by examiner

NOZZLE FOR DISPENSING CONCRETE, MORTAR OR THE LIKE

CROSS-REFERENCE TO RELATED APPLICATIONS

This application is a U.S. national stage entry of PCT Application No. PCT/EP2021/064593, filed Jun. 1, 2021, which claims the benefit of, and priority to German Patent Application No. 10 2020 003 760.7, filed Jun. 23, 2020.

The present invention relates to a nozzle for dispensing concrete, mortar or the like. Such nozzles are generally known, for example in connection with the processing of sprayed concrete. If rapid curing of the concrete, mortar or the like to be processed is desired, an additive, which is ideally already mixed intimately in the nozzle with the concrete, mortar or the like to be dispensed, can be added to the concrete, mortar or the like shortly before dispensing.

A nozzle of this kind is known from EP 3 431 172 A1, which nozzle can be used with suitable dimensioning of a mixing tube acting as a mixing chamber also for 3D printing of concrete, mortar or the like. The problem generally exists with such nozzles that on account of the admixed additive, which accelerates the curing of the concrete, mortar or the like, deposits can form increasingly inside the nozzle, in particular if the flow through the nozzle is stopped temporarily and then resumed again. These relatively rapidly solidifying deposits can disrupt the proper operation of the nozzle up to the point of total failure.

The object of the present invention, therefore, is to specify a nozzle for dispensing concrete, mortar or the like that is more tolerant and thus less susceptible to disruption with respect to such deposits forming in it.

This object is achieved by a nozzle that has the features indicated in Claim 1. The nozzle has a housing and a mixing chamber, which is arranged therein and is delimited by a circumferential wall and extends along a longitudinal axis at least between a supply opening and an outlet opening. Located in the mixing chamber is an actively driveable mixing device. The nozzle further has an exit opening, which is directly or indirectly flow-connected to the outlet opening. At least one cavity, which extends axially and in the circumferential direction, is formed according to the invention around the circumferential wall of the mixing chamber and is in contact with the circumferential wall and at least substantially surrounds the mixing chamber in the circumferential direction. By "at least substantially surrounds in the circumferential direction" it is meant here that the at least one cavity surrounds the greatest part of the circumference of the mixing chamber or even extends completely around the mixing chamber. Minor interruptions in this extension are harmless, however, as will be explained below. By "in contact with the circumferential wall" it is meant here that the outside of the circumferential wall delimiting the mixing chamber forms at least a portion of the inner delimitation of the cavity. According to the invention, the circumferential wall of the mixing chamber further consists of elastic material, which can deform into the at least one cavity in operation of the nozzle. Natural and synthetic rubber or caoutchouc materials, for example, are suitable as elastic material for the circumferential wall of the mixing chamber, likewise elastic plastics and similar. The elasticity of the elastic material used is selected depending on the substances to be dispensed using the nozzle such that the pressures and stresses occurring in the mixing chamber during operation of the nozzle and acting on the circumferential wall of the mixing chamber lead to temporary, at least local deformations of the mixing chamber circumferential wall into the at least one cavity. It is thus understood that said deformations of the mixing chamber circumferential wall are not permanent deformations, but are reversible deformations such that the circumferential wall of the mixing chamber repeatedly reverts to its original state following termination of the operation of the nozzle. It is also understood that the elastic material must be selected with respect to its properties such that it can withstand the stresses occurring in operation of the nozzle (with regard to stability, chemical resistance, abrasion resistance etc.).

According to the invention, the aforesaid at least one cavity is present in any case in the operating state of the nozzle. Configurations are conceivable in which the at least one cavity no longer exists in a resting state of the nozzle and is only produced in the operating state, for example by pressurising a corresponding region on the outside of the mixing chamber circumferential wall such that the mixing chamber circumferential wall moves radially inwards into an operating position in which the at least one cavity is then present outside of the mixing chamber circumferential wall.

The features according to the invention have the consequence that in operation of an inventive nozzle, the circumferential wall of the mixing chamber does not behave statically but constantly changes its shape on account of the deformations taking place into the at least one cavity. It is thereby prevented that deposits become stuck on the inside of the circumferential wall of the mixing chamber, and it is also achieved that deposits already adhering to the inside of the mixing chamber circumferential wall become detached again from the circumferential wall in that they spall off the circumferential wall, so to speak. The occurrence of larger deposits disrupting the operation of the nozzle can thus be avoided as far as possible.

In preferred embodiments of the nozzle, the mixing chamber of an inventive nozzle has a circular cylindrical, tubular shape, so that the mixing chamber can then also be described as a mixing tube. Such a circular cylindrical configuration of the mixing chamber is not a necessary prerequisite for the functioning of an inventive nozzle, however, which is why mixing chambers that do not have a circular cylindrical shape can also be used.

The at least one cavity, which is in contact with the circumferential wall and at least substantially surrounds the mixing chamber in the circumferential direction, can extend over at least substantially the entire length of the mixing chamber. It can thereby be ensured that no disruptive deposits occur on the inside of the mixing chamber circumferential wall over the entire length of the mixing chamber.

In other embodiments, several axially successive cavities can be present seen over the length of the mixing chamber, which each at least substantially surround the mixing chamber in the circumferential direction. It is thereby possible, for example, to configure the circumferential wall of the mixing chamber in multiple parts, so that in the event of failure or excessive wear of the mixing chamber circumferential wall, only the affected portion of the circumferential wall needs to be exchanged in each case.

Regardless of whether only one cavity or several of these are present, advantageous embodiments of the inventive nozzle are characterised in that a pressure application device is present, which is connected to the at least one cavity in order, by applying pressure to the mixing chamber circumferential wall, to deform the latter into the mixing chamber. This deformation of the circumferential wall into the mixing chamber can go so far that the inside of the mixing chamber circumferential wall comes into contact with the mixing device, which rotates during operation of the nozzle, whereby the mixing device can scrape off any deposits adhering to the inside of the mixing chamber circumferential wall. At the same time, due to the contact of the rotating mixing device with the mixing chamber circumferential wall, deposits located on the mixing device also can be removed. In embodiments of the inventive nozzle that are provided with a pressure application device, it is therefore possible that the circumferential wall of the mixing chamber is deformed during operation both into the cavity and into the mixing chamber, wherein the latter is controlled by the pressure applied by the pressure application device. The effect achieved and desired according to the invention is amplified in this way. If several cavities are present, not all cavities need to be connected to a pressure application device. On the contrary, it may suffice if those cavities surrounding regions of the mixing chamber that are particularly susceptible to internal soiling or the formation of deposits are connected to a pressure application device.

If desired, the cavity, some of the several cavities or all cavities can also be filled completely or partially with a material that does not disable the inventive function of the cavity or cavities. For example, an elastic foamed material can be contained in the cavity or in the cavities. In addition or alternatively to the aforesaid foamed material, a liquid, which can be used e.g. for heating or cooling the mixing chamber, can also be contained in the cavity or in the cavities. Care should then be taken, however, that such a liquid either does not fill the corresponding cavity completely or that the cavity is connected to an expansion vessel, as otherwise deformation desired according to the invention of the mixing chamber circumferential wall into the cavity would scarcely be possible any more.

According to one configuration, the mixing chamber is formed as an insert that can be inserted into the nozzle. Such an insert can consist of a suitable plastic material, for example. In the case of such an insert, the mixing chamber circumferential wall can be executed double-walled, so that the cavity, some of the several cavities or all cavities can be part of the insert in that it is or they are provided between a radially inner and a radially outer mixing chamber circumferential wall.

Preferred configurations of the inventive nozzle contain a flow cross-section reduction element, which is arranged centrally relative to the cross section of the mixing chamber in an end section of the mixing chamber comprising the outlet opening of the mixing chamber. In such configurations, one of the several cavities is further arranged such that it completely surrounds in the circumferential direction the region of the mixing chamber in which the flow cross-section reduction element is arranged. According to a development of such configurations, the portion of the circumferential wall associated with the cavity arranged in the region of the flow cross-section reduction element can be deformable by the application of pressure so far into the mixing chamber until the inside of the mixing chamber circumferential wall rests on the flow cross-section reduction element. In this way, an inventive nozzle can be shut off by quick and easy deformation of the corresponding portion of the mixing chamber circumferential wall and then reopened by relieving the pressure.

The aforementioned application of pressure to at least a portion of the circumferential wall takes place preferably pneumatically, hydraulically or mechanically, i.e. by pressurising the respective cavity or by mechanical pressurisation of the mixing chamber circumferential wall, which can be achieved, for example, by piston-like punches or also by an iris valve arranged around the corresponding region of the mixing chamber circumferential wall.

The flow cross-section reduction element in some embodiments is attached to a flange, which is located between the outlet opening of the mixing chamber and the exit opening of the nozzle. In this way a simple exchange of the flow cross-section reduction element is possible, for example to replace the flow cross-section reduction element or to exchange it for a differently shaped flow cross-section reduction element.

In other embodiments, the flow cross-section reduction element is attached to a nozzle element forming the exit opening. It can easily be ensured in this way that a flow cross-section reduction element particularly suitable for a certain nozzle element is used together with this nozzle element.

The mixing device located in the inventive nozzle can also be described as a mixing mechanism. Normal mixing devices or mixing mechanisms can be used if the desired mixing state can be achieved or ensured by them. A mixing or agitator shaft, which is driven in a rotating manner, for example, can be used as a mixing device.

The mixing device extends preferably at least from the supply opening up to an end section of the mixing chamber comprising the outlet opening of the mixing chamber. Good blending of the substance mixture to be dispensed with the nozzle can thus be achieved and at the same time deposits can be prevented from forming in the mixing chamber. In preferred embodiments of the inventive nozzle, the mixing device is a rotatable mixing shaft extending at least substantially axially. Such a mixing shaft can be provided in the customary manner with a number of agitator organs such as e.g. blades, discs and similar, which promote good blending.

In embodiments of the inventive nozzle in which the mixing device is formed as a mixing shaft or at least in the manner of a mixing shaft, the flow cross-section reduction element can be part of the mixing shaft in that the mixing shaft is provided at its end facing the outlet opening of the mixing chamber with a thickened mixing shaft head, which reduces the flow cross section of the mixing chamber.

Regardless of whether the flow cross-section reduction element is part of the mixing device or not, it is formed spherical or drop-shaped in preferred embodiments of the inventive nozzle, wherein with a drop-shaped formation the pointed end of the teardrop shape faces the exit opening of the nozzle.

For the efficient introduction of one or more additives into the mixing chamber, preferred configurations of the inventive nozzle have an additional opening, which is arranged concentric to the supply opening. In this way the supply of the main material and any additives takes place at the same point of the mixing chamber, which promotes an intimate mixing of main material and additive(s). Alternatively or in addition, however, at least one additional opening can be provided that is arranged at a different point of the mixing chamber than the supply opening.

To be able to dispense the substance mixture to be dispensed by means of the nozzle as flexibly and exactly positioned as possible, the exit opening in advantageous configurations of the inventive nozzle is part of a movable nozzle element, which can also be adjustable by motor according to one development.

Several configurations of an inventive nozzle are explained hereinafter by means of the enclosed schematic drawings. There is shown.

Figure 1:
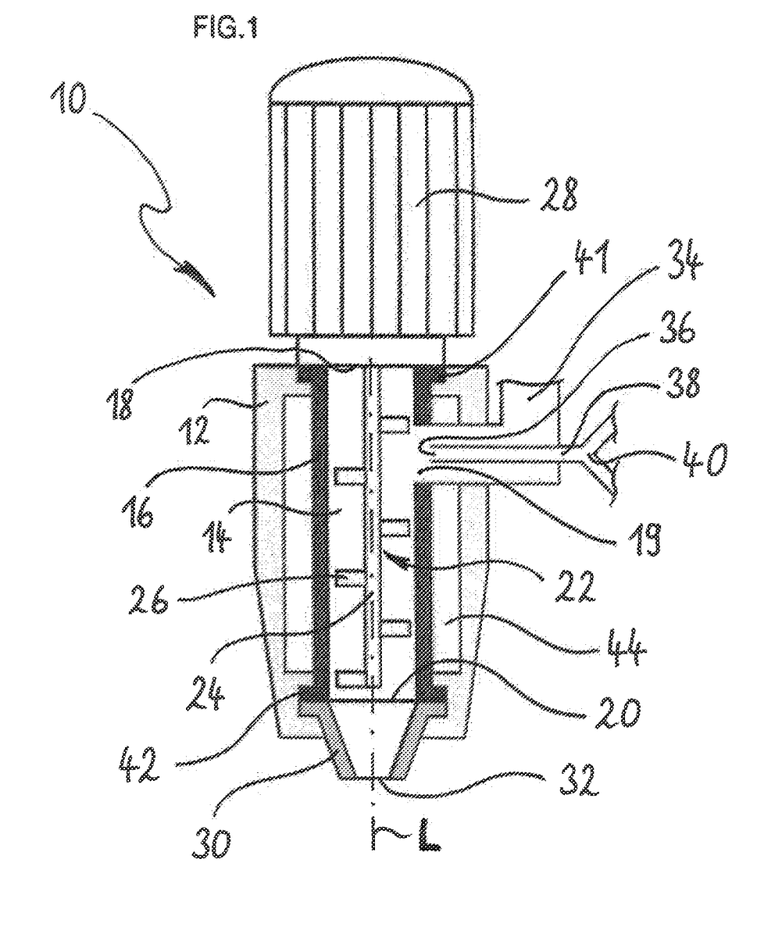
FIG. 1 a view, partly in longitudinal section, of a first embodiment of an inventive nozzle, FIG. 2 a view, partly in longitudinal section, of a second embodiment of an inventive nozzle, FIG. 3 a view, partly in longitudinal section, of a third embodiment of an inventive nozzle, FIG. 4 a view, partly in longitudinal section, of a fourth embodiment of an inventive nozzle, FIG. 5 a view, partly in longitudinal section, of a fifth embodiment of an inventive nozzle, FIG. 6 a view, partly in longitudinal section, of a sixth embodiment of an inventive nozzle, FIG. 7 a view, partly in longitudinal section, of a seventh embodiment of an inventive nozzle, FIG. 8 a view, partly in longitudinal section, of a eighth embodiment of an inventive nozzle, and FIG. 9 a view, partly in longitudinal section, of a ninth embodiment of an inventive nozzle, in which a mixing chamber is formed as an insert containing a cavity, which insert is inserted into a housing of the nozzle.

FIG. 1 shows a first embodiment of a nozzle 10 for dispensing concrete, mortar or the like in a view that is partly in longitudinal section. The nozzle 10 has a housing 12 with a mixing chamber 14 arranged therein, which is delimited by a circumferential wall 16. The terms "upper", "above", "lower", "below" and "laterally" used in connection with the enclosed figures are not to be understood absolutely but refer purely to the depiction of the nozzle 10 reproduced in the figures. It is understood that a nozzle 10 can assume any arbitrary and required orientation in operation.

In the embodiments depicted, the mixing chamber 14 has a circular cylindrical shape and the circumferential wall 16 accordingly has an annular cross section. In embodiments of this kind, the mixing chamber 14 and the circumferential wall 16 delimiting it can therefore also be referred to as a mixing tube.

The mixing chamber 14 extends in an axial direction along a longitudinal axis L from an upper end 18 of the mixing chamber 14 in the figures up to a lower end, which is formed by an outlet opening 20. In particular, the mixing chamber 14 extends between a supply opening 19, here arranged laterally, and the outlet opening 20. The supply opening 19 serves to introduce the concrete, mortar or the like into the mixing chamber 14.

Located in the mixing chamber 14 is an actively driveable mixing device, here in the form of a mixing mechanism 22 with a mixing shaft 24 extending axially through the mixing chamber 14, on which shaft several mixing blades 26 are affixed and protrude radially outwards. An electric motor 28 is connected to the upper end of the mixing shaft 24 and serves to drive the mixing shaft 24 and thus the entire mixing mechanism 22 in a rotary manner, in order to cause the mixing shaft 24 to rotate about the longitudinal axis L. Instead of the electric motor 28 shown here, the mixing shaft 24 can also be driven in another way mechanically, pneumatically or hydrodynamically. The mixing mechanism 22 depicted should likewise be viewed purely as an example. Instead of the mixing mechanism 22 shown, any other mixing mechanism or any other mixing device can be used with which a desired mixture can be obtained in the mixing chamber 14.

Arranged below the mixing chamber 14 is a nozzle element 30, which forms an exit opening 32 of the nozzle 10 at its lower, free end. In the embodiments depicted here, the nozzle element 30 is attached in each case to the housing 12 and has a flow cross section tapering conically in the flow direction. As depicted, the outlet opening 20 of the mixing chamber 14 is flow-connected to the nozzle element 30 and thus to the exit opening 32, so that during operation of the nozzle 10, material can be dispensed from the mixing chamber 14 through the exit opening 32.

To be able to introduce material to be dispensed into the mixing chamber 14, the supply opening 19 of the mixing chamber 14 is connected to a supply line 34, which extends from the supply opening 19 outwards through the housing 12 and which can be formed as a supply pipe and/or a supply hose, for example. The main constituents of a material mixture to be dispensed are supplied to the mixing chamber 14 through the supply line 34. For example, the supply line 34 can be connected directly to a concrete or mortar mixing device (not shown), wherein the concrete or mortar mixing device produces concrete or mortar or the like and presses it through the supply line 34 into the mixing chamber 14 of the nozzle 10.

Under certain circumstances it is necessary to add one or more other substances to the material mixture supplied to the mixing chamber 14 through the supply line 34 in order to adjust accurately the properties of the material mixture to be dispensed with the nozzle 10. If the material mixture to be dispensed is to cure quickly, for example, it is necessary to add an additive shortening the curing time to the material mixture shortly before it is dispensed. An additional opening 36 is used for this, which opening is arranged in the first embodiment of the nozzle 10 shown in FIG. 1 inside the supply opening 19 and concentric to the supply opening 19, and is connected to an additive line 38, which is led, like the supply line 34, out of the housing 12 of the nozzle 10. Shown schematically outside of the supply line 34 is a branching 40 of the additive line 38, so that at least two additives can be supplied to the mixing chamber 14 through the additive line 38 at the same time.

The circumferential wall 16 of the mixing chamber 14 consists of an elastically flexible material such as rubber, caoutchouc (natural or also synthetic in each case), for example, or also an elastic plastic material, which is selected depending on the intended purpose of the nozzle 10 such that it has the required resistance with respect to mechanical, chemical and thermal influences. Formed respectively at the upper and lower end of the circumferential wall 16 is a flange 41, 42, which serves to fix the corresponding end of the circumferential wall 16 on the housing 12. With suitable dimensioning of the flanges 41, 42, these can also be used to seal the mixing chamber 14 with respect to the housing 12, the motor 28 and the nozzle element 30.

Formed in the housing 12 between the circumferential wall 16 of the mixing chamber 14 and the housing 12 is a cavity 44, which extends axially and in the circumferential direction and the radially inner delimitation of which is constituted by the outside of the circumferential wall 16, so that the cavity 44 is in direct contact with the circumferential wall 16. In the first embodiment depicted, the cavity 44 runs completely around the mixing chamber 14 and extends axially over virtually the entire length of the mixing chamber 14.

In operation of the nozzle 10, on account of the supply of material taking place through the supply opening 19, which takes place at a certain pressure, and also due to the agitating motion of the mixing mechanism 22 in the mixing chamber 14, varying pressures arise, which act on the inside of the circumferential wall 16. These constantly varying pressure conditions in the mixing chamber during operation have the consequence that the circumferential wall 16 repeatedly deforms from its original shape depicted in FIG. 1 locally into the cavity 44 and then springs back again, in suitable other pressure conditions, to its original shape. The cavity 44 is specially provided to permit such an at least temporary local or even larger-scale deformation of the circumferential wall 16 radially outwards. This continuously newly arising deformation of the circumferential wall 16 radially outwards and back again during operation of the nozzle 10 has the consequence that no deposits or only very slight deposits can stick to the inside of the circumferential wall 16. To achieve this effect, the circumferential wall 16 does not need to deform significantly; on the contrary, deformations in the range of a few millimetres are sufficient to achieve "spalling" of deposits that have already formed and to prevent the formation of new deposits.

The other embodiments of an inventive nozzle 10 described below all resemble the first embodiment and are therefore only explained in greater detail with regard to their differences from the first embodiment.

Figure 2:
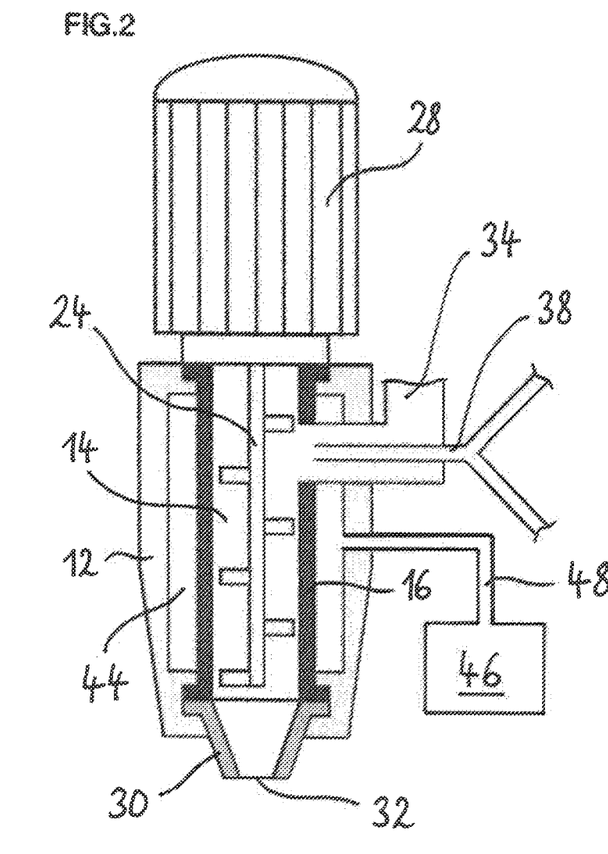

FIG. 2 shows a second embodiment of an inventive nozzle 10 likewise in a view partly in longitudinal section. Additionally to the first embodiment shown in FIG. 1, the second embodiment has a pressure application device 46, which makes it possible to supply pressure to the cavity 44 via a line 48 in order thus to optionally pressurise the cavity 44. In operation of the nozzle 10, deformation of the circumferential wall 16 radially inwards, i.e. in the direction of the mixing shaft 24, can thereby be achieved, which supports or amplifies the self-cleaning effect that is achieved by the deformation of the circumferential wall 16 radially outwards that is described in connection with the first embodiment. Pressurisation of the cavity 44 surrounding the mixing chamber 14 by means of the pressure application device 46 can take place intermittently, i.e. the cavity 44 can be pressurised and then the pressure relieved again at desired time intervals, so that the circumferential wall 16 deforms alternately radially outwards and radially inwards during operation of the nozzle 10. In this case deformation of the circumferential wall 16 can take place radially inwards up to contact of the inside of the circumferential wall 16 with the mixing blades 26, so that the mixing blades 26 rotating with the mixing shaft 24 scrape clean the inside of the circumferential wall 16 and at the same time deposits that might have formed on the mixing blades 26 can be detached.

Figure 3:
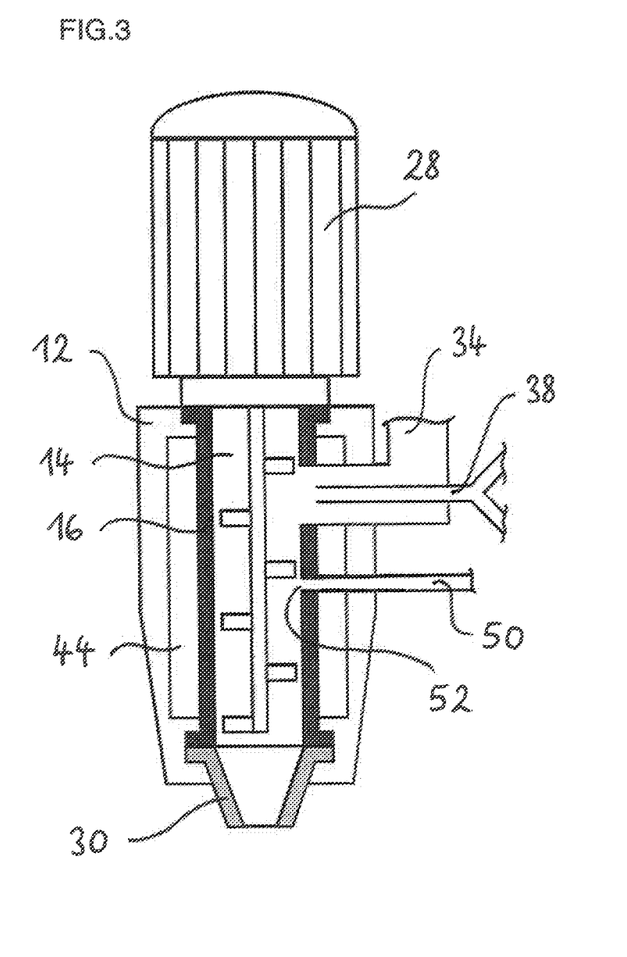

FIG. 3 shows a third embodiment of an inventive nozzle 10, again in a view partly in longitudinal section. Additionally to the first embodiment shown in FIG. 1, this third embodiment has another additive line 50, which is connected to another additional opening 52 in the circumferential wall 16, through which a further additive can be introduced directly into the mixing chamber 14 if desired. The further additional opening 52 can also be used to supply certain additives at a point lower down the mixing chamber 14, for example to reduce their dwell time in the mixing chamber 14. This can be desirable, for example, in the case of an additive that shortens the curing time of concrete, mortar or the like.

Figure 4:
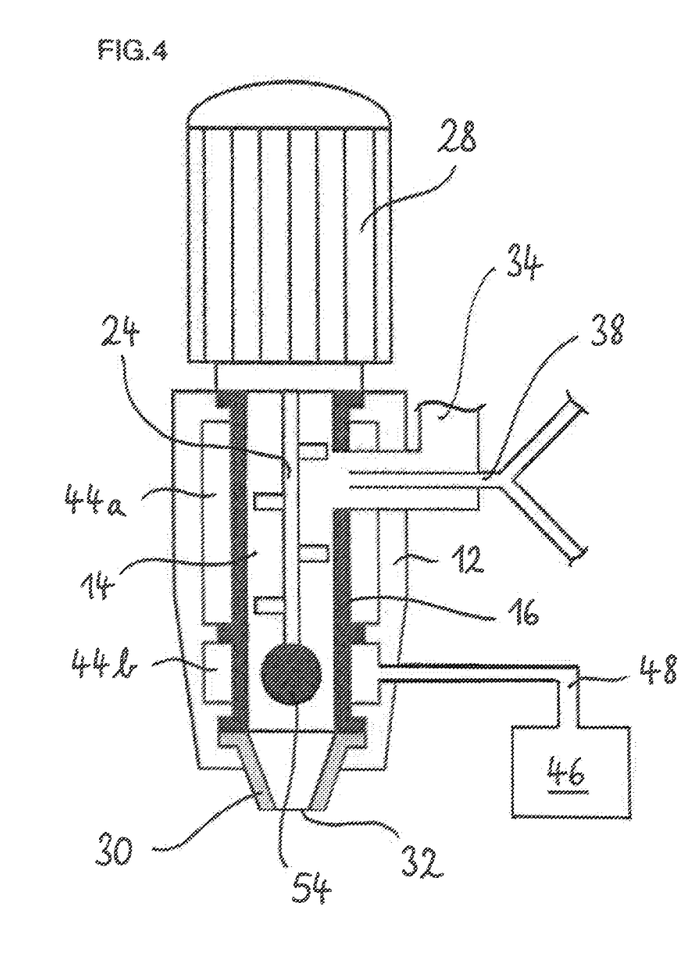

FIG. 4 shows a fourth embodiment of an inventive nozzle 10 in a view partly in longitudinal section. In contrast to the first embodiment, instead of the cavity 44, two cavities 44*a*, 44*b* are present, which each extend completely around the mixing chamber 14 and are arranged in axial succession. The upper cavity 44*a* in FIG. 4 runs roughly from the upper end 18 of the mixing chamber 14 over approx. 75% of the length of the mixing chamber 14, whereas the lower cavity 44*b* covers the remaining approx. 25% of the longitudinal extension of the mixing chamber 14. Furthermore, affixed to the lower end of the mixing shaft 24 is a flow cross-section reduction element 54, which has a spherical shape here and is arranged centrally in the mixing chamber 14. In operation of the nozzle 10, the material mixture to be dispensed flows past the flow cross-section reduction element 54 to the outlet opening 20 of the mixing chamber and on through the exit opening 32 of the nozzle element 30.

As depicted, the pressure application device 46 in the fourth embodiment is connected via the line 48 to the lower cavity 44*b*. This makes it possible to pressurise the lower cavity 44*b* selectively and thereby deform the circumferential wall 16 in this region so far radially inwards that it rests on the flow cross-section reduction element 54, in order thus to temporarily stop a material flow out of the nozzle 10. By simple pressure relief of the cavity 44*b*, the circumferential wall 16 in the region of the lower cavity 44*b* returns to its original setting and thus opens the nozzle 10. The nozzle 10 can be equipped in this way with a reliable and rapidly reacting valve to stop and release the material flow through the nozzle 10. During operation of the nozzle 10, the pressure application device 46 can naturally also be used to deform the circumferential wall 16 as described above in connection with the second embodiment. Moreover, the upper cavity 44*a* can also be coupled to the pressure application device 46 or another pressure application device in order to deform the portion of the circumferential wall 16 associated with the upper cavity 44*a* also in such a way as described in connection with the second embodiment.

Figure 5:
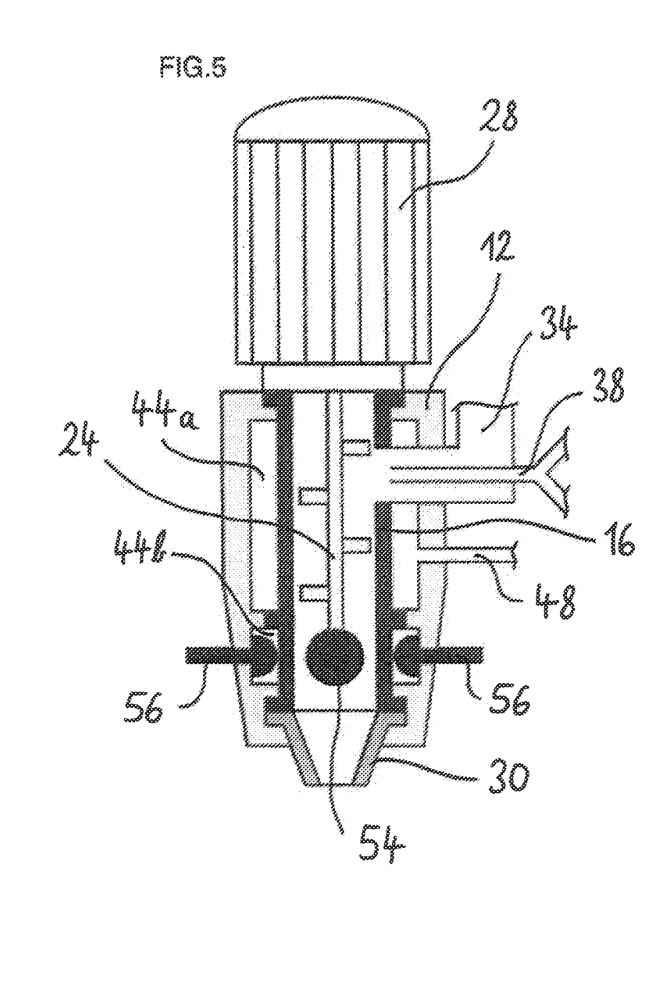

FIG. 5 shows a fifth embodiment of an inventive nozzle 10 in a view partly in longitudinal section. This fifth embodiment depicts a combination of the second and fourth embodiment, wherein the deformation directed radially inwards of the section of the circumferential wall 16 associated with the lower cavity 44*b* takes place not pneumatically by means of the pressure application device 46 but by means of mechanical actuators 56. Such mechanical actuators 56 can be mechanically driven punches, for example, which press the circumferential wall 16 radially inwards, or also a mechanically driven iris diaphragm, which on closing reduces its free cross section and thereby constricts the circumferential wall 16 and presses it against the flow cross-section reduction element 54. Other solutions are likewise conceivable. The upper cavity 44*a* is connected via the line 48 to the pressure application device 46 (not shown in FIG. 5).

Figure 6:
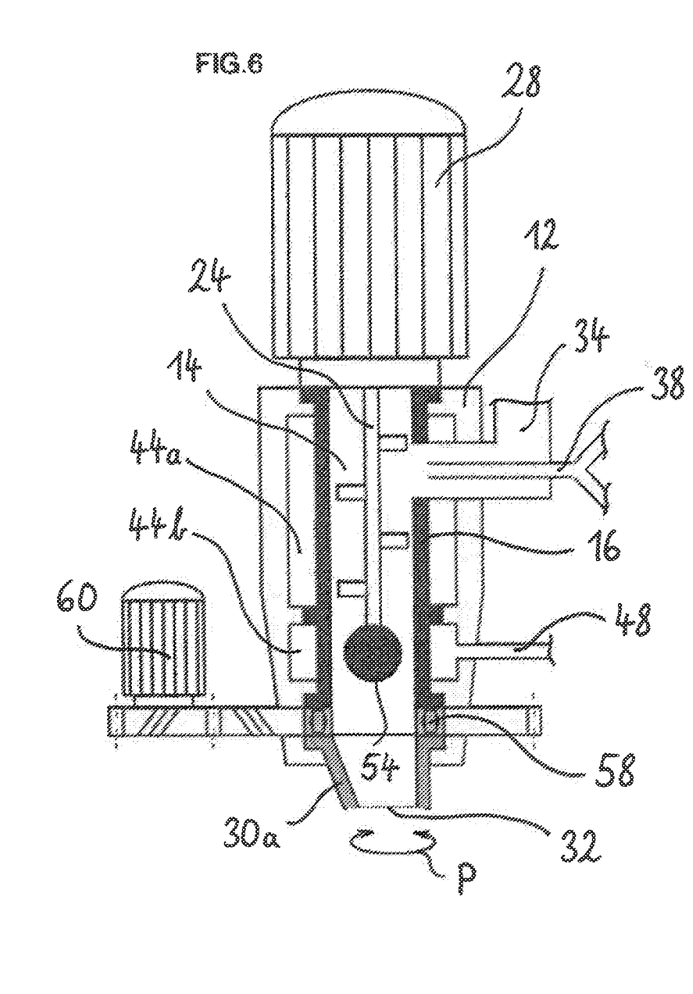

FIG. 6 shows a sixth embodiment of an inventive nozzle 10 in a view partly in longitudinal section. The structure of this embodiment basically corresponds to the fourth embodiment, but the nozzle element 30*a* is supported rotatably at 58 and can be rotated by means of an actuating drive 60 in any desired direction (symbolised by the arrow P in FIG. 6) even in ongoing operation of the nozzle 10. The nozzle element 30*a* here is formed in contrast to the nozzle element 30 in such a way that rotation of the nozzle element 30*a* about the longitudinal axis L leads to a changed emission direction.

Figure 7:
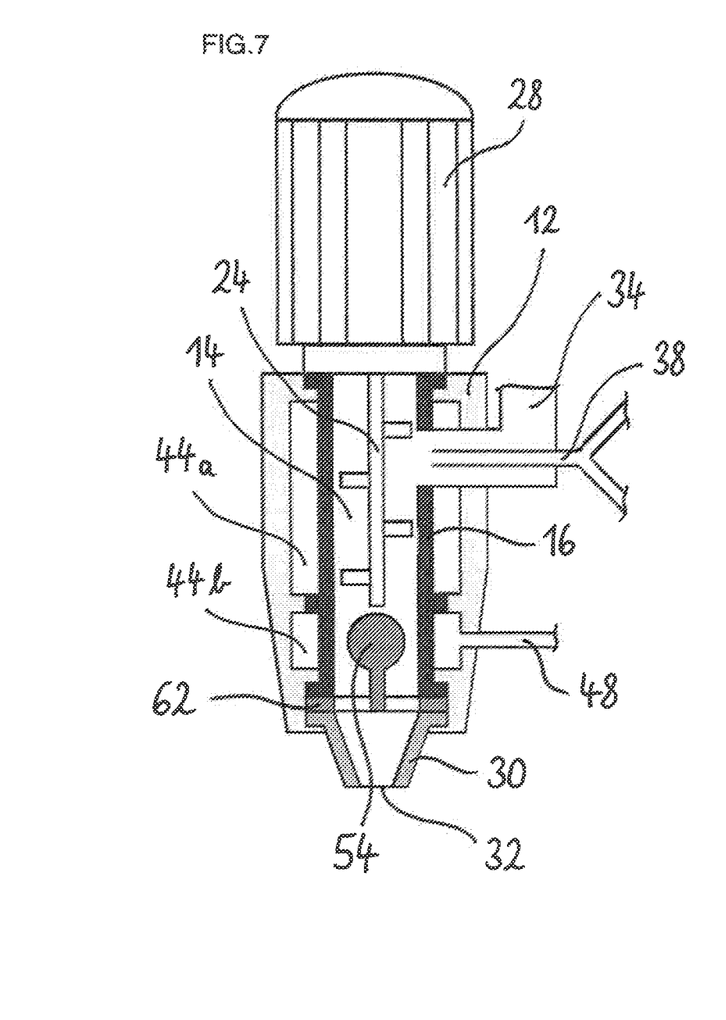

FIG. 7 shows a seventh embodiment of an inventive nozzle 10 in a view partly in longitudinal section. This seventh embodiment substantially corresponds to the fourth embodiment, but the flow cross-section reduction element 54 in the seventh embodiment is attached not to the mixing shaft 24 but to a flange 62, which is arranged axially between the lower end of the mixing chamber 14 and the nozzle element 30 in the housing 12 and carries the flow cross-section reduction element 54, which extends from the flange 62 into the lower end section of the mixing chamber 14. A configuration of this kind permits a simple exchange of the flow cross-section reduction element 54 for a new or also different flow cross-section reduction element without having to access the mixing shaft 24.

Figure 8:
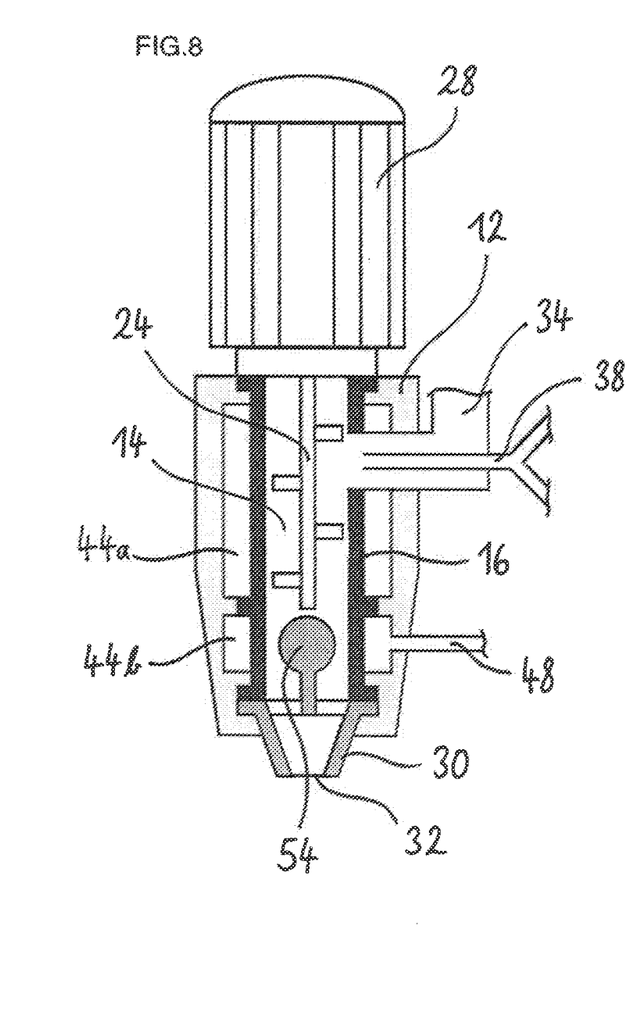

FIG. 8 shows an eighth embodiment of an inventive nozzle 10 in a view partly in longitudinal section, which differs from the seventh embodiment in that the flow cross-section reduction element 54 is attached to the nozzle element 30 and extends from the nozzle element 30 into the lower end section of the mixing chamber 14. In an embodiment of this kind, the flow cross-section reduction element 54 can simply be exchanged or replaced together with the nozzle element 30. Furthermore, a specifically shaped flow cross-section reduction element, which is particularly suitable for a certain nozzle element, can be combined with the certain nozzle element in this way with no risk of confusion.

The flow cross-section reduction element 54 in the embodiments shown has been depicted in each case as having a spherical shape. This spherical shape is only by way of example, however. The flow cross-section reduction element can also be drop-shaped, for example, wherein the pointed end of the teardrop shape then preferably faces the exit opening 32. Other spatial configurations of the flow cross-section reduction element are likewise conceivable and can be used to influence the flow behaviour in the end section of the mixing chamber 14.

Figure 9:
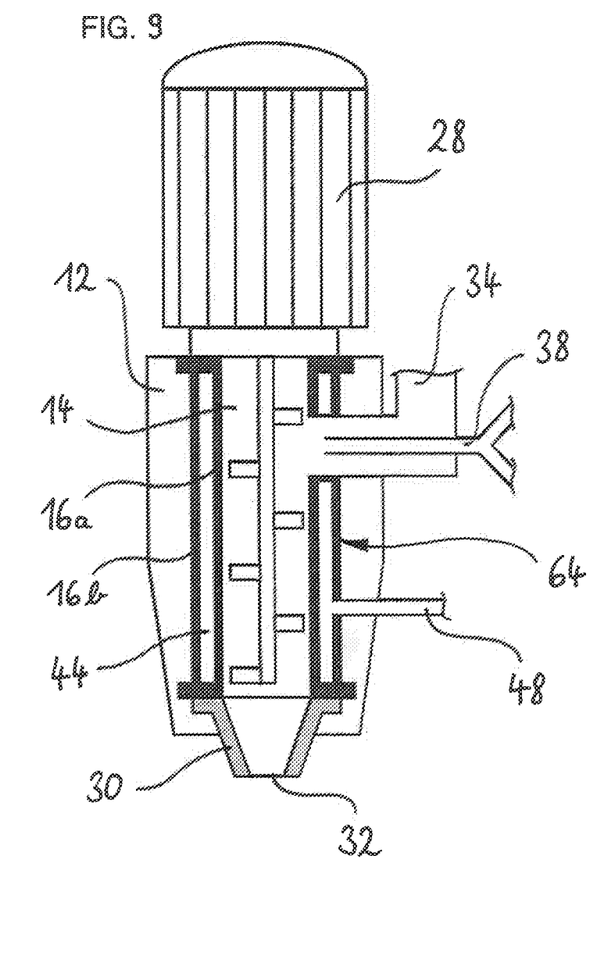

FIG. 9 shows a ninth embodiment of an inventive nozzle 10 in a view partly in longitudinal section, which corresponds substantially to the second embodiment shown in FIG. 2. In the ninth embodiment, however, the cavity 44 is part of an insert 64, which forms the mixing chamber 14 and is inserted into the housing 12 of the nozzle 10. The insert 64 can consist, like the circumferential wall 16 of the embodiments explained previously, of a suitable plastic material, for example, and has a radially inner circumferential wall 16a and, spaced radially at a distance therefrom, a radially outer circumferential wall 16b. The cavity 44 is located between the radially inner circumferential wall 16a and the radially outer circumferential wall 16b. Instead of one cavity 44, the insert 64 can also contain several cavities (not shown).

All previously explained embodiments of the nozzle 10 are exemplary configurations. Every expert will understand that many features of the embodiments shown can also be used in other embodiments. For example, all embodiments can have another additive line 50 and another additional opening 52 or also several such additive lines and additional openings. Furthermore, instead of the cavity 44, more than just two cavities 44a, 44b can be present and all, some or none of the cavities can be connected to a pressure application device 46.

The invention claimed is:

1. A dispensing nozzle for concrete, mortar or the like, comprising:
a housing and a mixing chamber arranged therein, the mixing chamber delimited by a circumferential wall, and the mixing chamber extending along a longitudinal axis at least between a supply opening and an outlet opening,
an actively driveable mixing device arranged in the mixing chamber, and
a nozzle element with an exit opening directly or indirectly flow-connected to the outlet opening of the mixing chamber, and
at least one cavity extending axially and in a circumferential direction around, and in contact with, the circumferential wall of the mixing chamber, the at least one cavity at least substantially surrounding the mixing chamber in the circumferential direction,
wherein the circumferential wall of the mixing chamber comprises an elastic material configured to deform dynamically into the at least one cavity during operation of the dispensing nozzle.

2. The dispensing nozzle of claim 1, wherein the at least one cavity extends over at least substantially an entire length of the mixing chamber.

3. The dispensing nozzle of claim 1, wherein the at least one cavity comprises several cavities at least substantially surrounding the mixing chamber in the circumferential direction.

4. The dispensing nozzle of claim 1, further comprising a pressure application device connected to the at least one cavity and configured to apply pressure to deform the circumferential wall into the mixing chamber.

5. The dispensing nozzle of claim 1, wherein the at least one cavity is part of an insert forming the mixing chamber, which insert is configured to be inserted into the housing.

6. The dispensing nozzle of claim 3, wherein arranged centrally in the mixing chamber in an end section of the mixing chamber comprising the outlet opening of the mixing chamber is a flow cross-section reduction element, and wherein one of the several cavities is arranged in the region of the flow cross-section reduction element and completely surrounds the mixing chamber in the circumferential direction.

7. The dispensing nozzle of claim 6, wherein the portion of the circumferential wall associated with the cavity arranged in the region of the flow cross-section reduction element is deformable into the mixing chamber by the application of pressure until the portion of the circumferential wall rests on the flow cross-section reduction element.

8. The dispensing nozzle of claim 7, wherein the application of pressure to the portion of the circumferential wall associated with the cavity arranged in the region of the flow cross-section reduction element is achieved by pneumatic, hydraulic or mechanical means.

9. The dispensing nozzle of claim 6, wherein the flow cross-section reduction element is attached to a flange located between the outlet opening of the mixing chamber and the exit opening.

10. The dispensing nozzle of claim 6, wherein the flow cross-section reduction element is attached to the nozzle element forming the exit opening.

11. The dispensing nozzle of claim 1, wherein the mixing device extends from the supply opening to an end section of the mixing chamber comprising the outlet opening of the mixing chamber.

12. The dispensing nozzle of claim 11, wherein the mixing device comprises a rotatable mixing shaft extending at least substantially axially.

13. The dispensing nozzle of claim 12, wherein the mixing shaft is provided at an end of the mixing shaft facing the outlet opening of the mixing chamber with a thickened mixing shaft head forming a flow cross-section reduction element.

14. The dispensing nozzle of claim 6, wherein the flow cross-section reduction element is spherical or drop-shaped.

15. The dispensing nozzle of claim 1, wherein an additional opening for introducing one or more additives into the mixing chamber is arranged concentric to the supply opening.

16. The dispensing nozzle of claim 1, wherein the exit opening is part of a movable nozzle element.

17. The dispensing nozzle of claim 16, wherein the nozzle element is motor-adjustable.

* * * * *